US008306255B1

(12) United States Patent
Degnan

(10) Patent No.: US 8,306,255 B1
(45) Date of Patent: Nov. 6, 2012

(54) SNAPSHOT-BASED SCREEN SCRAPING

(75) Inventor: Oliver Degnan, Jackson, WI (US)

(73) Assignee: Intuit Inc., Mountain View, CA (US)

( * ) Notice: Subject to any disclaimer, the term of this patent is extended or adjusted under 35 U.S.C. 154(b) by 930 days.

(21) Appl. No.: 12/200,416

(22) Filed: Aug. 28, 2008

(51) Int. Cl.
*G06K 9/00* (2006.01)
*G06F 17/00* (2006.01)

(52) U.S. Cl. ........................................ 382/100; 707/639

(58) Field of Classification Search .................. 382/100, 382/176, 290, 292, 317, 321; 386/246; 707/709, 707/710, 739, 649, 639, 917; 709/246; 715/234, 715/239, 254, 256; 705/14.1; 345/621
See application file for complete search history.

(56) References Cited

U.S. PATENT DOCUMENTS

| | | | | |
|---|---|---|---|---|
| 6,643,641 | B1 * | 11/2003 | Snyder | 707/709 |
| 2004/0049598 | A1 * | 3/2004 | Tucker et al. | 709/246 |
| 2008/0282186 | A1 * | 11/2008 | Basavaraju | 715/781 |

* cited by examiner

*Primary Examiner* — Abolfazl Tabatabai
(74) *Attorney, Agent, or Firm* — Park, Vaughan, Fleming & Dowler LLP

(57) ABSTRACT

A method is provided for scraping information from a web page or other page of electronic content. As opposed to existing methods in which an entire page's HTML (HyperText Markup Language) code or DOM (Document Object Model) tree is parsed and pattern-matched, in the provided method only specific regions of interest are examined closely. An image snapshot of the page is created and investigated using routines for identifying regions of interest (e.g., paragraphs of text, faces). Regions comprising text are then converted into text using OCR (Optical Character Recognition) technology or a similar tool, and the resulting text can then be scanned for symbols, words or phrases of interest.

10 Claims, 2 Drawing Sheets

Web Page Image 100

SNAPSHOT-BASED SCREEN SCRAPING

BACKGROUND

This invention relates to the field of computer systems. More particularly, methods are provided for making the capture of data from a displayed page more efficient.

Current methods of extracting data from a web page are inefficient because they involve reading into memory and parsing large amounts of information, and then applying pattern-matching rules to find the specific data that are desired. Even if only a relatively small amount of data is to be captured, a relatively large amount of information (e.g., the entire page) must be processed.

For example, when the page to be scraped comprises HTML (HyperText Markup Language) code, the page's entire DOM (Document Object Model) tree is read into memory for parsing. As the code is parsed, it is searched for particular HTML tags that correspond to information that is desired.

This process of reading the page's DOM into memory, parsing it and performing pattern-matching is very processor-intensive, especially since the HTML source code is captured in string form. Storage space in memory and memory pointers must be maintained for the entire period of time needed to complete the processing.

SUMMARY

In one embodiment of the invention, a method is provided for scraping information from a web page or other page of electronic content. As opposed to existing methods in which an entire page's HTML (HyperText Markup Language) code or DOM (Document Object Model) tree is parsed and pattern-matched, in the provided method only specific regions of interest are examined closely.

In this embodiment, an image snapshot of the page is created (e.g., as a PNG or Portable Network Graphics image) and examined using routines for identifying regions of interest (e.g., faces, paragraphs of text). If the desired content is textual, regions found to comprise text are then scanned to convert their contents into text using OCR (Optical Character Recognition) technology or a similar tool. The resulting text can then be scanned for symbols, words or phrases of interest.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, methods are provided for more efficiently scraping desired data from a web page or other page of content. In these methods, instead of scraping the entire page, only certain regions of the page that may contain the desired data are scraped.

In one implementation of this embodiment, an image snapshot of an HTML (HyperText Markup Language) page is created and then scanned for regions of interest. The remainder of the page can be ignored. Each region of interest may be processed using Optical Character Recognition (OCR) technology or another algorithm for extracting data from a region of an image. OCR may be used, for example, if the desired data is textual in nature. A face-identification algorithm may be used if the desired data comprises an image of a human face. Other algorithms may be used to identify regions containing other specific content or types of content.

The image snapshot may be generated as the HTML page is loaded into memory by a web browser or other application. In one implementation the image snapshot is a vectorized Portable Network Graphics (PNG) image, although in other implementations other image types may be used.

Figure 1:
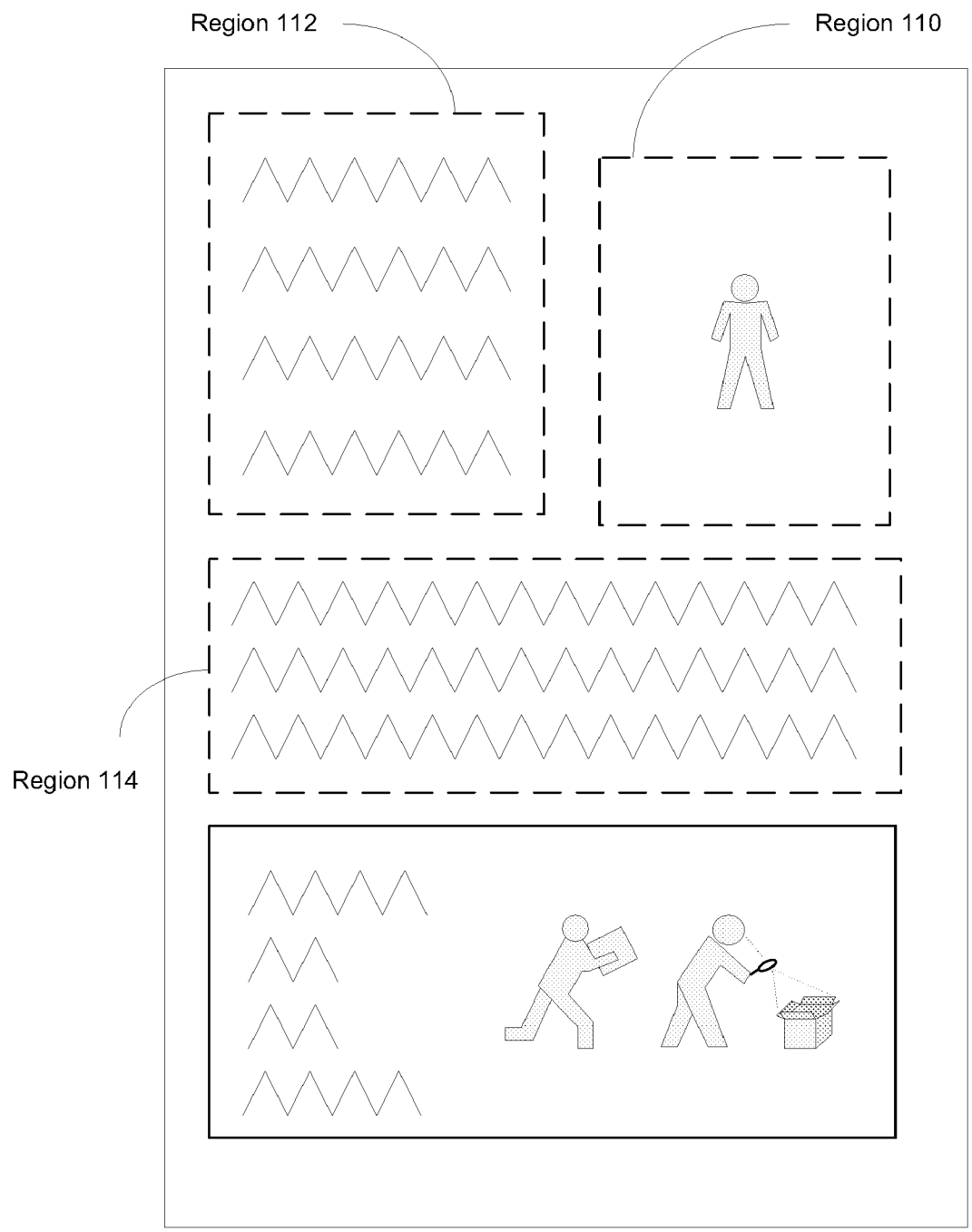
FIG. 1 is a block diagram depicting snapshot-based screen scraping in accordance with an embodiment of the present invention.

FIG. 1 is a block diagram demonstrating how snapshot-based screen scraping may be performed in an embodiment of the invention. In this embodiment, image 100 is an image snapshot of a web page comprising HTML and/or other code, and may also include images, links to other content, etc. As specified above, image 100 may be generated as the contents of the web page are loaded or, alternatively, may be created after the page is loaded into a browser, or may even be created offline.

Different region-identification algorithms may be executed to identify different types of regions within the image, such as regions 110, 112, 114. For example, a routine for identifying an image of a body might identify region 110 as being of interest because content in that region matches the routine's definition of a body. Another algorithm may be configured to identify faces, and so may identify all or a portion of region 110, and or other areas of image 100, as being of interest.

These algorithms may search for particular combinations or patterns of pixels, light and dark areas, and so on. When a target pattern is matched, some area around the target could be captured (e.g., a rectangular area defined by lines surrounding the object, picture or frame in which the match is found).

Figure 2:
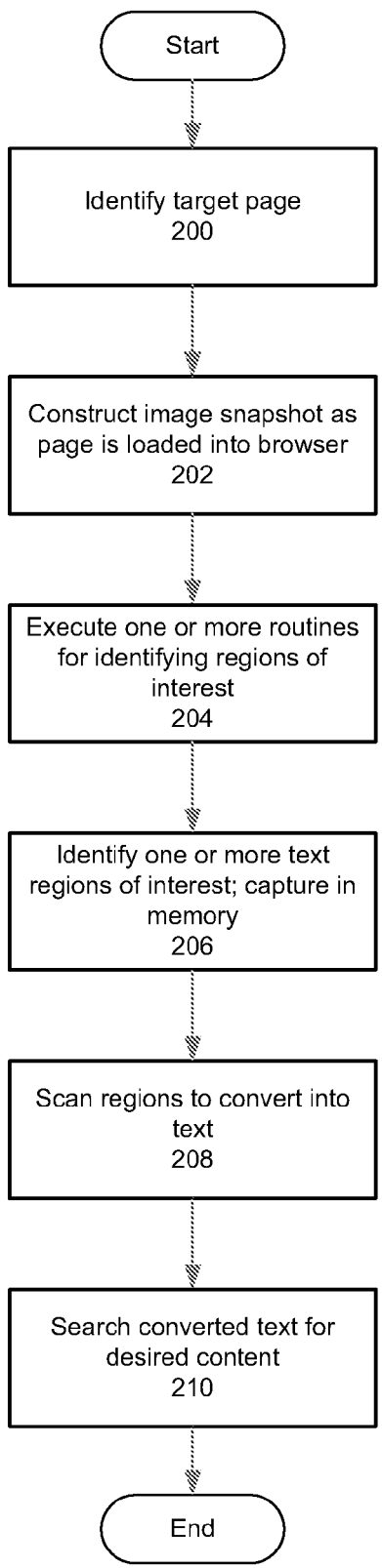
FIG. 2 is a flowchart illustrating one method of snapshot-based screen scraping in accordance with an embodiment of the invention.

FIG. 2 is a flowchart demonstrating a method of applying snapshot-based screen scraping according to one embodiment of the invention, and is described as it may be applied to image 100 of FIG. 1 to find desired text (e.g., in regions 112, 114).

In operation 200, the web page or other page of content is identified. In this embodiment, the page to be scraped is a web page navigated to directly (e.g., by entering its Uniform Resource Locator or URL) or via a link. A web browser commences loading the page for display.

In operation 202, image 100 is constructed as the web page content is streamed to the browser. More particularly, the stream of HTML comprising the web page is used to generate a PNG image of that page's content. In other embodiments of the invention, the page image may be generated in some other format.

In operation 204, one or more region-identification algorithms are executed to search image 100 for regions of interest. In this embodiment, the page is being scraped to find text comprising financial news or information, and so an algorithm may be designed to find blocks of text (e.g., by paragraph).

For example, an algorithm may analyze image 100 to locate regions in which horizontal strips of whitespace separate horizontal areas containing alternating black and white patterns (i.e., to find lines of text separated by whitespace), and bounded by some additional amount of whitespace. Or, the algorithm may specifically analyze the image for characters of text, possibly by searching for pixel patterns that match English text. A region may need to be of some minimal size in order to qualify for further processing so as to avoid capturing short textual advertisements, isolated phrases and other text snippets unlikely to be significant.

In different embodiments of the invention, regions of interest may be of varying sizes (e.g., paragraphs, entire frames of content, a single line). In particular, an algorithm for identifying a region of interest may use any characteristic of image 100, at any level of detail, to find a region. Thus, whereas in the illustrated embodiment of the invention an algorithm is configured to identify collections of text (i.e., by paragraph), in other embodiments an algorithm may look at individual textual characters or other collections (e.g., lines). In yet other embodiments, an algorithm for identifying a region of interest may consider virtually any characteristics or patterns of a set of pixels (or other component parts of an image), depending on whether the desired content is textual, pictorial, etc.

In operation 206, regions 112, 114 are identified and captured in memory, and the remainder of image 100 is discarded.

In operation 208, the regions of interest are scanned using OCR software or some other algorithm for extracting text from an image.

In operation 210, the text scanned from the regions of interest is searched for matches with target words, phrases, symbols, etc. If, for example, the page is being scraped for financial news or information, the text may be searched for symbols of world currencies (e.g., $, ¥, €), particular words (e.g., "stock market", "finance", "merger"), and so on.

As another example if the page was being scraped to identify names of doctors, text extracted from the regions of interest may be scanned for the words "Doctor" or "doctor," patterns such as "Dr.", "DR", "MD" and so on. If such a pattern is found, then words preceding and/or following the match may also be saved in order to capture the doctor's name.

If any text patterns are matched within a region, some or all of the captured text may used immediately or saved for processing (e.g., to produce a summary, to serve to a user interested in financial news).

The environment in which a present embodiment of the invention is executed may incorporate a general-purpose computer or a special purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of scraping text from a portion of a web page without scraping the entire page, the method comprising:
   identifying the web page;
   generating an image snapshot of the entire web page;
   receiving an image pattern;
   identifying, by computer, a region of the image snapshot to perform scraping, wherein said identifying involves searching the image snapshot for a region that matches the received image pattern, and wherein the identified region is not the entire web page; and
   scraping content from the identified region.

2. The method of claim 1, further comprising:
   discarding any unidentified portion of the image snapshot.

3. The method of claim 1, wherein said scraping content comprises:
   converting data within the identified region to text.

4. The method of claim 3, further comprising:
   searching the text for desired information.

5. The method of claim 1, wherein said generating an image snapshot comprises:
   receiving content of the web page; and
   converting the content into a PNG (Portable Network Graphics) image.

6. The method of claim 1, further comprising:
   discarding all of the web page outside the identified regions.

7. The method of claim 1, wherein the identifying involves determining an image region comprising text.

8. The method of claim 1, further comprising:
   receiving an image characteristic to be used for identifying a region; and
   selecting an algorithm based on the received image characteristic for identifying the region.

9. A non-transitory computer-readable medium storing instructions that, when executed by a computer, cause the computer to perform a method of scraping text from a portion of a web page without scraping the entire page, the method comprising:
   identifying the web page;
   generating an image snapshot of the entire web page;
   receiving an image pattern;
   identifying a region of the image snapshot to perform scraping, wherein said identifying involves searching the image snapshot for a region that matches the received image pattern, and wherein the identified region is not the entire web page; and
   scraping content from the identified region.

10. An apparatus for scraping text from a portion of a web page without scraping the entire page, comprising:
- a processor;
- a memory;
- an identification mechanism configured to identify the web page;
- an image generation mechanism configured to generate an image snapshot of the entire web page;
- a receiving mechanism configured to receive an image pattern;
- the identification mechanism further configured to identify a region of the image snapshot to perform scraping, wherein said identifying involves searching the image snapshot for a region that matches the received image pattern, and wherein the identified region is not the entire web page; and
- a scraping mechanism configured to scrape content from the identified region.

* * * * *